Aug. 30, 1932. H. W. PORTER 1,874,616
CUTTING TOOL
Filed Nov. 18, 1930 2 Sheets-Sheet 1

Inventor:
Henry W. Porter,
by Emery, Booth, Varney & Townsend
Attys

Aug. 30, 1932.  H. W. PORTER  1,874,616
CUTTING TOOL
Filed Nov. 18, 1930   2 Sheets-Sheet 2
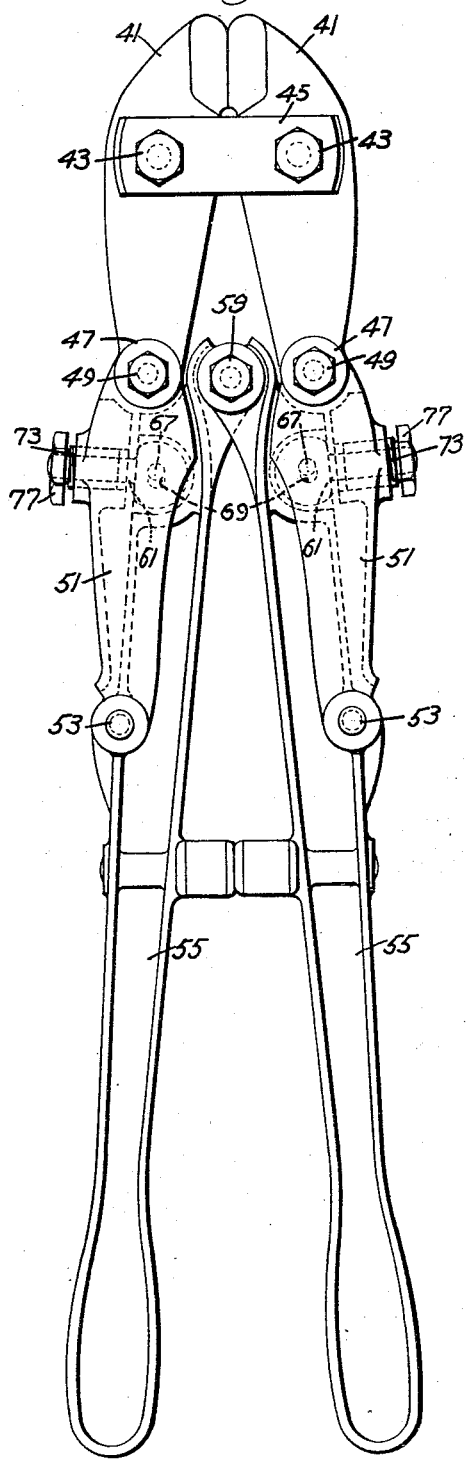
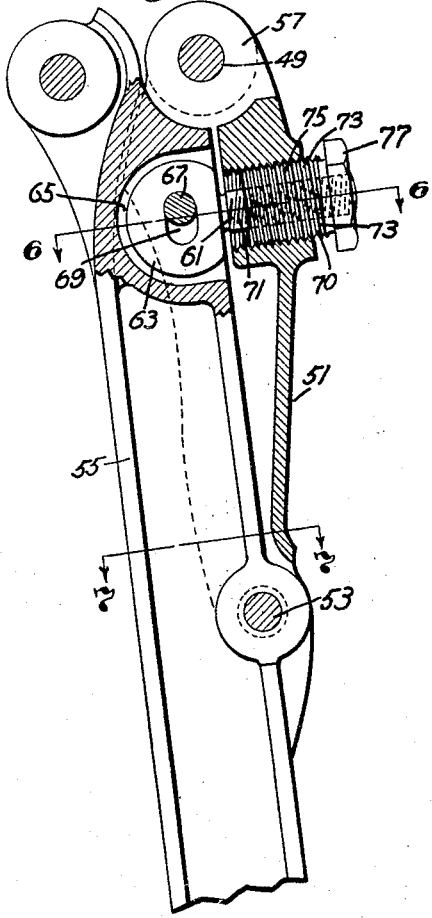
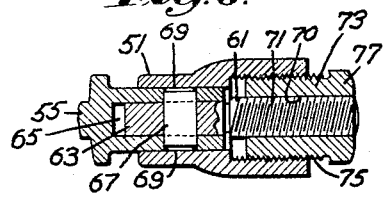
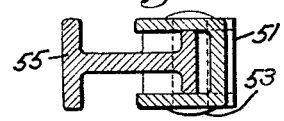
Inventor:
Henry W. Porter, Patented Aug. 30, 1932

1,874,616

UNITED STATES PATENT OFFICE

HENRY W. PORTER, OF BROOKLINE, MASSACHUSETTS, ASSIGNOR TO H. K. PORTER, INC., A CORPORATION OF MASSACHUSETTS

CUTTING TOOL

Application filed November 18, 1930. Serial No. 496,461.

This invention aims to provide strong quick setting adjusting sections for cutting tools and the like.

In the accompanying drawings I have shown merely for illustrative purposes certain embodiments of my invention, wherein:

Fig. 4 is a side elevation of a cutting tool showing a modified arrangement of adjusting sections;

Fig. 5 is a detailed elevation partly in section of one of the adjusting sections of the tool shown in Fig. 4;

Fig. 6 is a detail transverse section on line 6—6 of Fig. 5; and

Fig. 7 is a detail transverse section taken on line 7—7 of Fig. 5.

Figure 1:
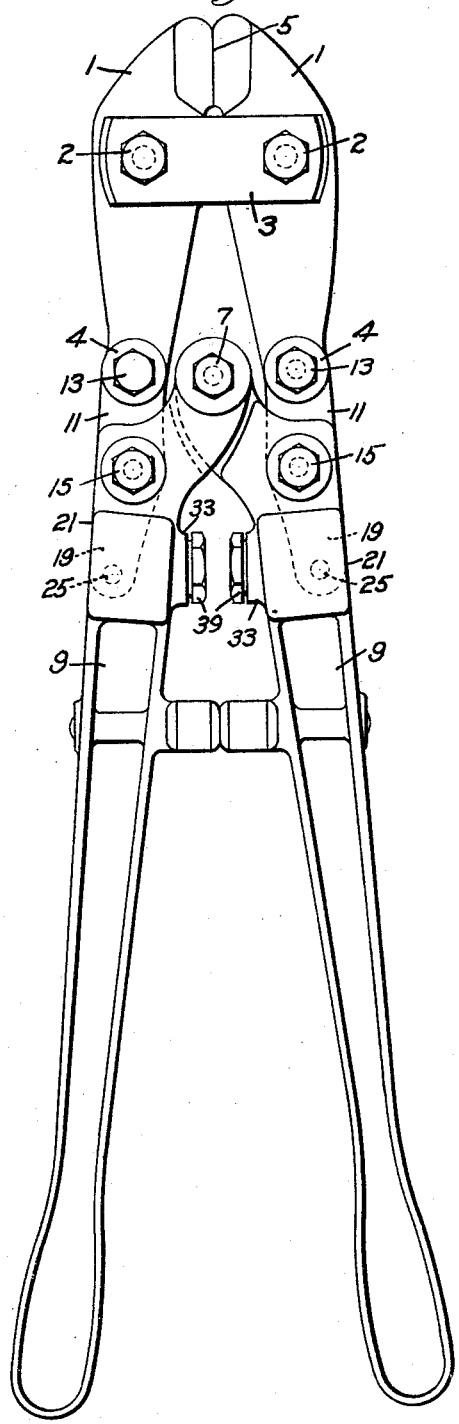
Figure 1 is a side elevation of my improved cutting tool.

The particular embodiment of the invention selected for purposes of illustration and shown in the drawings comprises cutting jaws 1 pivotally connected in cooperative relation by screws 2 and straps 3, although the invention is not limited to the particular arrangement shown.

The tail ends 4 of the cutting jaws 1, at least when the cutting edges 5 of said cutting jaws are in contact, are arranged in separated relation, and between these tails is arranged the pivotal stud 7 which unites the handle members 9.

An adjusting section 11 is interposed between the tail 4 of each cutting jaw 1 and the handle lever 9 therefor. This adjusting section is herein shown pivotally connected by a screw 13 or other suitable member to one end of the jaw 1. Said adjusting section 11 is furthermore pivotally connected at 15 with its respective handle lever 9.

Figure 2:
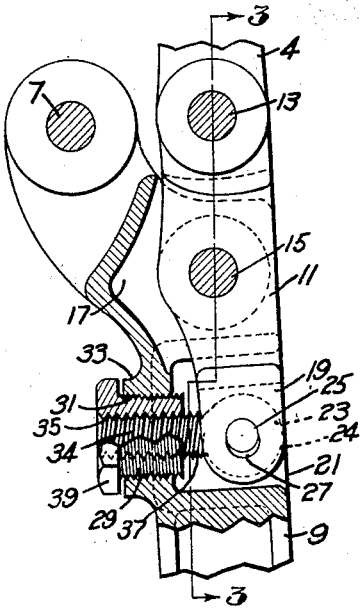
Fig. 2 is a detail section of one of the adjusting sections thereof.
Figure 3:
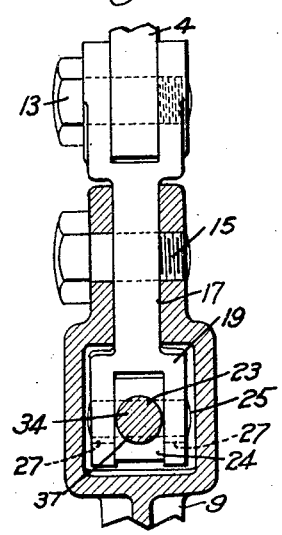
Fig. 3 is a detail sectional view of the adjusting section taken on line 3—3 of Fig. 2.

Each handle lever is recessed at 17, Figs. 2 and 3, to receive the pivoted portion of said adjusting section, and this recess is extended downwardly of said handle member to enclose the other or free end 19 of the adjusting section 11.

The recess 17 of said handle member is desirably extended to the outer edge 21 of the handle lever, thereby greatly facilitating the manufacture as well as the assembling of the tool.

The aforesaid free end 19 of the adjusting section 11 as herein shown has pivotally connected thereto an eye bolt 23 by means of a pivot pin 25. Desirably the free end 19 of said adjusting section 11 is forked at 26 to straddle the head 24 of said eye bolt 23. The pin 25 rather tightly fits said eye 24 of said bolt 23 but the ends of said pin are arranged in slots 27 for the purpose hereinafter set forth. The pin 25 although in relatively tight fitting relation to the eye 24 is prevented from working out of the forked end 26 by the fact that the lower portion of the recess 17, within which the free end of said adjusting section swings, encloses said forked end and its pivot, and after being assembled said pivot will be prevented from working out of said adjusting sections.

For the purpose of providing quick setting powerful adjusting elements for the adjusting section 11, I desirably provide a sleeve 29 having external screw threads 31 engaging a relatively fixed part of the handle lever 9, for example the boss 33 formed at the inner edge thereof and within which screw threads are formed to fit said external threads of the sleeve 29. The sleeve 29 is also drilled and tapped axially at 35 and the threads thereof are adapted to fit threads 37 formed upon the shank of said bolt.

The aforesaid sleeve 29 and the eye bolt 23 with their respective screw threads constitute a differential or compound adjusting means for the swinging of the adjusting section 11 by reason of the fact that the screw threads 31 are single and relatively fine threads, whereas those formed upon the shank of said bolt are at least double threads of opposite pitch and relatively steep. The sleeve 29 is also provided with a polygonal head 39 which projects beyond the boss 33 upon the inside edge of the tool, and upon rotation of this head by a wrench or other tool, formed to fit said head, a rotary motion will be imparted to said sleeve and thereby effect a slight axial movement thereof in the boss 33. This rotary action produces an axial movement of the screw eye body 34 inasmuch as the screw threads thereof are coarser and of a steeper and opposite pitch than the threads on said sleeve and produce a greater movement of the eye axially than that produced by the mere rotation of said sleeve. This movement is due to the fact that the eye bolt is prevented from being rotated by the forked end of the adjusting section 11.

It will be clearly apparent that the forked end of the member 11 carrying the pivot pin 25 will move in an arc struck from the axis of the pivot 15, whereas the eye bolt 23 will move in a relatively straight line approximately coincident with the axis of the sleeve 29, and for this purpose the slots 27 are provided.

Referring now to Figs. 4, 5, 6 and 7, wherein I have illustrated a modified form of adjusting section for use in connection with a slightly different type of cutting tool, 41 indicates a pair of cooperating cutting jaws, herein shown pivotally connected together by screws 43 and straps 45. The tails 47 are herein shown pivotally connected, at 49, with adjusting sections 51 which in turn are pivotally attached, at 53, to handle levers 55. In the modified form herein referred to I have preferably shown the adjusting section 51 pivotally connected at its forward end 57, by the hereinbefore mentioned pivotal connection 49, with the tail 47 of its respective cutting jaw. The opposite end of said adjusting section 51 is pivotally connected by the said pivot 53 with the handle lever 55 thereof. The swinging of the adjusting section 51 about the axis of the pivot 53 for the purpose of varying the relation of the pivot 49 with the axis of the adjusting lever 55, herein shown at 59, is effected by differential adjusting means arranged intermediate the pivots 49 and 53, said differential adjusting means comprising an eye bolt 61 having an eye 63, herein inserted in snugly fitting relation in a recess 65 formed in a part of its respective handle lever 51. A pin 67 is inserted through said eye 63 and through slots 69 formed therein. The shank of said bolt is provided with relatively coarse screw threads 71 desirably composed of steep and at least double threads. These threads are arranged in engagement with similarly formed screw threads 70 interiorly of a sleeve 73. The sleeve 73 is in turn externally threaded with relatively fine single threads of opposite pitch 75 arranged to engage corresponding screw threads formed interiorly of an adjacent edge of the adjusting section 51. The sleeve 73 is also provided with a polygonal head 77 by means of which a rotary action may be imparted thereto.

The head 77 of this form of adjusting device is, in contradistinction to the form shown in Figs. 1 and 2, arranged adjacent to the outer edge of the tool although its operation is effected in substantially the same manner as that referred to in connection with said Figs. 1 and 2, namely upon each rotation of the element 77 the sleeve will be moved axially of the adjusting section 51 a distance equal to the lead of said single threads 75, and this distance plus a distance equal to the lead of said double threads on the shank of said bolt represents the total movement of the axis of the pivotal connection 67 on an arc swung about the axis of the pivotal connection 53.

By reason of the foregoing constructions it will be apparent that the differential devices described will, because of the slight turning of the sleeves 29 and 73, produce a relatively greater movement of the parts operated by said screw, and these screw means will be powerful, easily operated, and capable of withstanding all of the pressure likely to be exerted thereupon without danger of breaking or without undue wear.

The invention is not limited to the embodiment shown.

I claim:

1. In a cutting tool of the compound lever type, in combination with a pivoted cutting jaw lever, the operating means therefor including a handle lever proper and an adjusting section pivoted thereto, one of said parts being pivoted to the jaw lever and the other having a pivotal bearing and a unitary device for relatively adjusting said handle lever and adjusting section about their pivot whereby to position relatively the other pivots of said operating means comprising a bolt pivoted to one of said parts to move the same therewith in either direction and extending laterally to one side and a cooperating nut carried by the other member to move the bolt in or out.

2. In a cutting tool of the compound lever type, in combination with a pivoted cutting jaw lever, the operating means therefor including a handle lever proper and an adjusting section pivoted thereto, one of said parts being pivoted to the jaw lever and the other having a pivotal bearing and a unitary device for relatively adjusting said handle lever and adjusting section about their pivot whereby to position relatively the other pivots of said operating means comprising a bolt pivoted to one of said parts to move the same therewith in either direction and extending laterally to one side and a cooperating nut having an external threaded engagement with the other member and adapted on rotation to shift the bolt either in or out.

3. In a cutting tool, in combination, a pivoted cutting jaw lever, a pivoted handle lever, an intermediate adjusting section pivoted at one end to said jaw lever and at its other end to the handle lever between the ends thereof and extending over the side of the handle lever, and a unitary adjustment device located as an entirety between the ends of said adjustment section and engaging the handle lever to move therewith either in or out, said device including a single means effecting movement in either direction exposed at the outer side of the section.

4. In a cutting tool of the compound lever type, in combination with a pivoted cutting jaw lever, the operating means therefor including a handle lever proper and an adjusting section pivoted thereto, one of said parts being pivoted to the jaw lever and the other having a pivotal bearing, a bolt cooperating with the tail of said section, one of said parts having a fork-head receiving the other, a pin pivotally connecting them, the handle lever having a pocket receiving the fork-head, a nut cooperating with the bolt and connected to the handle lever alternatively to push or pull on said bolt, the mounting of said bolt and nut having provision permitting the swinging movement of adjusting section when the bolt is shifted longitudinally.

5. In a cutting tool of the compound lever type, in combination with a pivoted cutting jaw lever, the operating means therefor including a handle lever proper and an adjusting section pivoted thereto, one of said parts being pivoted to the jaw lever and the other having a pivotal bearing, a bolt pivoted to one of the last recited parts, the pivotal joint being such as to permit relative swinging movement of said part on linear movement of the bolt and a nut cooperating with said bolt carried by the other part and effective on turning movement either to pull or push the same.

6. In a cutting tool of the compound lever type, in combination with a pivoted cutting jaw lever, the operating means therefor including a handle lever proper and an adjusting section pivoted thereto, one of said parts being pivoted to the jaw lever and the other having a pivotal bearing, said section pivoted to the handle member and extending beyond its pivot thereon to provide a tail, said handle lever having an open-sided pocket in which said tail is received, a bolt pivotally jointed to said tail, a cooperating nut connected to the bottom wall of said pocket alternatively to push or pull on said bolt, the mounting of said bolt and nut having provision permitting the swinging movement of the adjusting section when the bolt is shifted longitudinally.

In testimony whereof, I have signed my name to this specification.

HENRY W. PORTER.